No. 845,844. PATENTED MAR. 5, 1907.
W. N. BEECHER.
INTERCHANGEABLE VEHICLE BODY.
APPLICATION FILED MAR. 1, 1906.
2 SHEETS—SHEET 1.
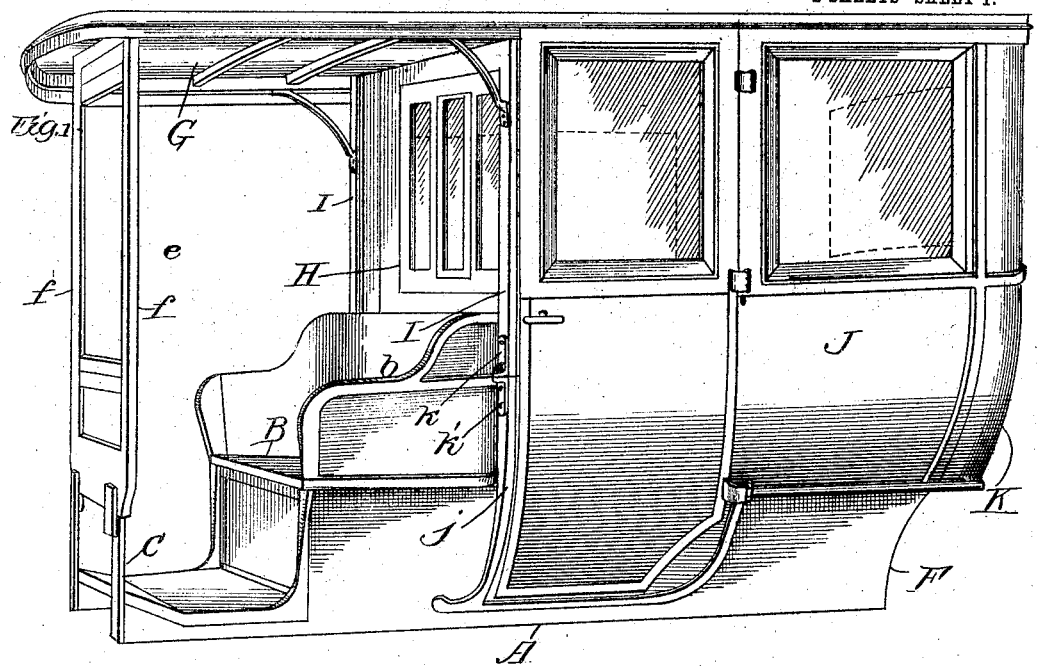
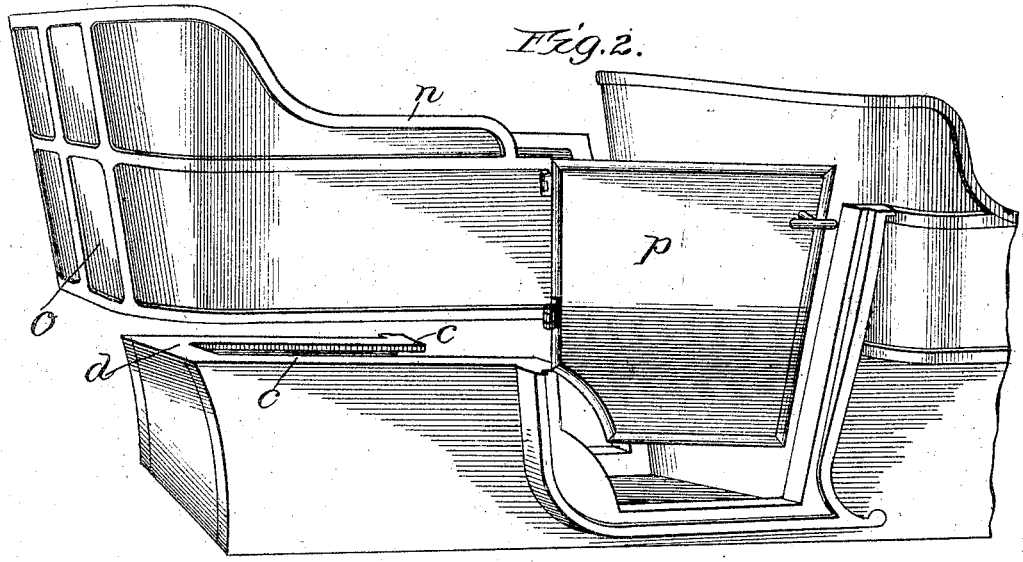
Witnesses:
Inventor.
Walter N. Beecher.

No. 845,844. PATENTED MAR. 5, 1907.
W. N. BEECHER.
INTERCHANGEABLE VEHICLE BODY.
APPLICATION FILED MAR. 1, 1906.
2 SHEETS—SHEET 2.
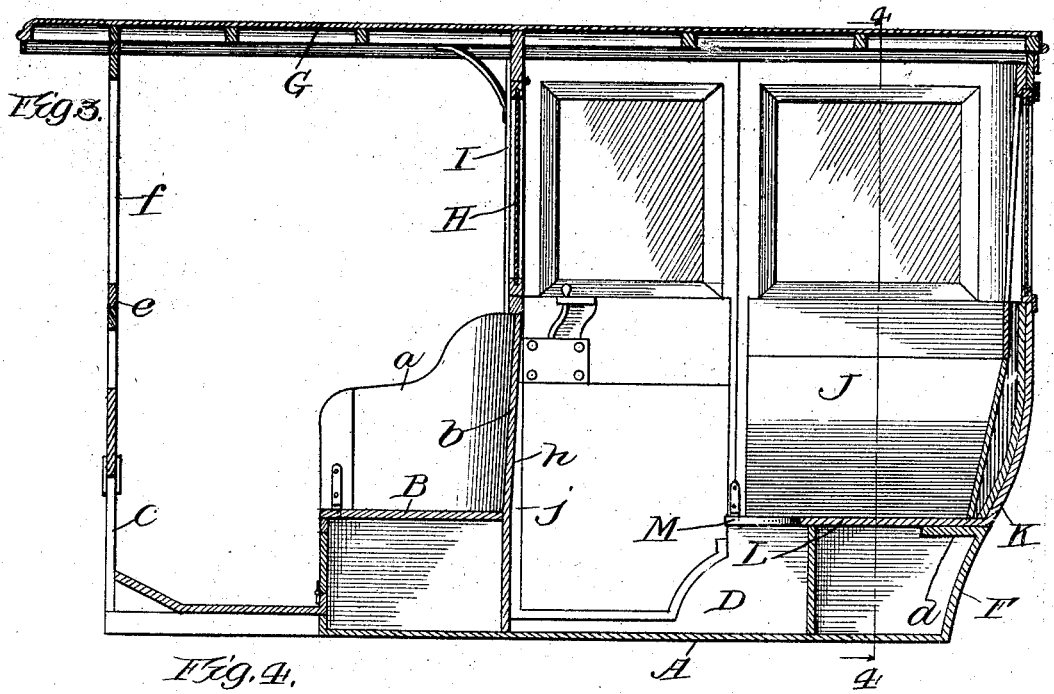
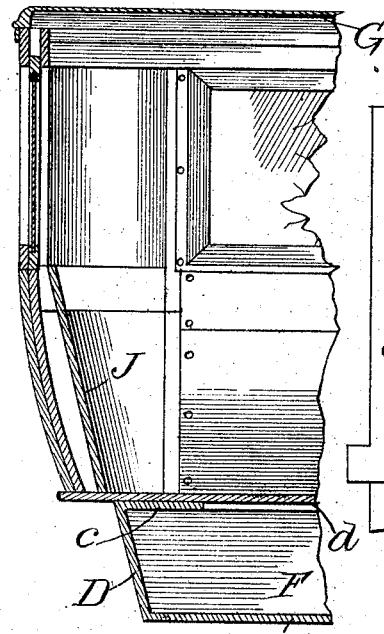
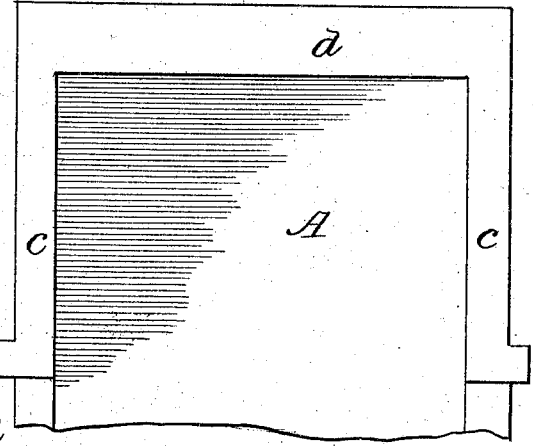

UNITED STATES PATENT OFFICE.

WALTER N. BEECHER, OF CHICAGO, ILLINOIS.

INTERCHANGEABLE VEHICLE-BODY.

No. 845,844.    Specification of Letters Patent.    Patented March 5, 1907.

Application filed March 1, 1906. Serial No. 303,738.

*To all whom it may concern:*

Be it known that I, WALTER N. BEECHER, a citizen of the United States, and a resident of Chicago, in the county of Cook and State of Illinois, have invented certain new and useful Improvements in Interchangeable Vehicle-Bodies, of which the following is a clear, full, and exact description.

The object of my invention is to provide a body for vehicles so constructed that the upper part may be removed or replaced by another upper portion, so as to convert the same from a coupe tonneau, landaulet, or a limousine body or any other style of vehicle without disturbing the connection of the lower part of the body with the running-gear and do this quickly and at a minimum expense, substantially as hereinafter fully described and as particularly pointed out in the claims.

In the drawings, Figure 1 is a perspective view of my invention having a limousine-top. Fig. 2 is a side view of the same with a tonneau-top suspended above the same. Fig. 3 is a longitudinal central section of the style of body shown in Fig. 1. Fig. 4 is a transverse vertical section taken on dotted line 4 4, Fig. 3. Fig. 5 is a detail view of a locking device used in connection therewith. Fig. 6 is a plan view of the lower body with the limousine removed.

Reference being had to the drawings, the lower part of the body is shown to comprise a suitable floor A, having a dashboard C at its forward end and a front seat B, the ends *a* of which I prefer to curve where they join the back *b*, the end edges of which extend to the transverse plane of the side of the vehicle. The side walls D of the body form the end support for the seat, from thence extend to the rear greatly reduced in height for a sufficient distance to form the jamb for the lower portion of the door-opening. To the rear of the door-opening the side walls are raised to the height of the rear seat and have their upper edges provided with inturned flanges *c*. These inturned flanges *c* and a transverse flange *d*, projecting horizontally forward from the upper edges of the rear end wall F of the body form the principal support for the rear of the superstructure composing the removable upper portion of the body of the carriage.

The upper body may consist of a limousine-top or a landaulet-top or a coupe tonneau or a runabout tonneau or any other style of vehicle-top capable of being placed and secured to the lower body, and I desire to be considered as contemplating the combination of any style of removable upper body with any style of lower body permanently secured to the chassis of an automobile or gear of any other vehicle as within the scope of my invention. The upper body shown in Figs. 1, 3, and 4 of the drawings is what is known as a "limousine" and consists of an inclosed rear part and an open front part, all under one roof G—that is, preferably formed with or secured to the inclosed rear part or limousine. The front end of the roof is supported by a drop-framework *e*, having vertical side strips *f*, that are connected at their lower ends to the vertical side posts of the dashboard in such manner as to allow of their being easily separated therefrom. If desired, glass may be set in this drop-frame, or it may simply consist of the strips *f*, suitably reinforced by transverse rails to give it sufficient rigidity. The front seat B of the lower body preferably has its arm-rests lower than its back *b* and the rear portions rounded where they merge into the same. The back *b* of the seat forms the central portion of the transverse wall *h*, dividing the front from the rear portion of the body, which wall *h* extends downward to the floor of the said body and has its ends extended slightly beyond where the curved rear portion of the arm-rests merges into it, and terminate in vertical corner-posts *j*, the upper ends of which are about as high as the upper edges of the arm-rests of the front seat. Now the front wall H of the inclosed rear portion of the upper body extends down from the roof of the same in the same transverse plane as wall *h* of the lower body, and its ends terminate in corner-posts I, which when in proper position on the lower body rest on the upper ends of the corner-posts *j* end to end. The upper posts are secured to the lower posts preferably by means of plates *k k'*, which are secured longitudinally to the upper and lower posts, respectively, and have their adjacent ends outturned and connected by a suitable bolt and nut. The side walls J and rear end wall K of the rear part of the inclosed portion of the upper body extend down from the roof such a distance that when the upper corner-posts I rest upon the lower posts *j* (the upper and lower bodies being in their proper horizontal position) their lower edges will rest upon the inturned flanges *c c* and *d* of the upper edges of the rear part of the side walls and the rear end wall of the lower body.

The rear seat L connects the side walls J and the end walls K of the upper body, and it has side extensions M, that extend forward from its ends as far as the forward vertical edges of the said side walls J, that rest upon the flanges *c c* and *d* and are screwed or otherwise connected thereto. The doors for the limousine are connected to the forward edges of the side walls of the upper body, and when the latter is properly fitted upon the lower body these doors close the space between said side walls and the posts I and the door-opening in the side walls of the lower body as well. Thus it will be seen that all that it is necessary to do to secure the limousine to the lower body would be to fasten the drop-wall to the dashboard, the upper corner-posts I to the lower corner-posts *j*, and the rear seat and its extensions to the inturned flanges of the upper edges of the rear portion of the side walls of the lower body. This enables the upper body to be easily and quickly secured in place or removed from the lower body.

In Fig. 2 of the drawings I show a tonneau upper body in a position above and slightly separated from the lower body hereinbefore described. This tonneau consists of a rear end wall *o*, side walls *n n*, doors *p p*, hinged to the forward vertical edges of said side walls and a rear seat connecting the lower edges of said side walls and rear end wall and otherwise constructed the same as the seat L of the limousine upper body hereinbefore described. The doors *p p* are only as high as the side walls, which latter when said tonneau is secured to the lower body are about the same height as the arm-rests of the front seat and close the door-openings of the lower body.

I do not wish to be considered as limiting myself to the exact construction of the lower body, as that may be changed according as required to enable the upper body to be secured thereto. I much prefer the lower body to be constructed, however, as shown and described.

What I claim as new is—

1. In a vehicle the combination with a permanent lower body having an integral front seat, and a rear portion having a door-opening therein, of an upper body removably secured thereto having an integral seat and a door closing the door-opening in said lower body.

2. In a vehicle the combination with a permanent lower body having an integral front seat, and a rear portion having door-openings in its sides, of an upper body removably secured thereto having doors hinged to its side walls that close the door-openings in the lower body.

3. In a vehicle the combination with a permanent lower body having a front seat made integral therewith, and a door-opening in the rear portion thereof, of a roofed upper body removably secured thereto having a door-opening and having a door hinged thereto for closing the door-opening therein and the door-opening of the lower body.

4. In a vehicle the combination with a permanent lower body having a front seat made integral therewith, and door-openings in the side walls of the rear portion thereof, of a roofed upper body removably secured thereto having door-openings in its side walls back of said front seat, and doors hinged to said last-mentioned side walls for closing both the door-openings therein and the door-opening in the lower body.

5. In a vehicle the combination with a permanent lower body having a front seat made integral therewith, and door-openings in the side walls of the rear portion thereof, of a roofed upper body removably secured thereto having door-openings in its side walls back of said front seat, doors hinged to said last-mentioned side walls for closing both the door-openings therein and the door-opening in the lower body, and a rear seat for said upper body.

6. In a vehicle the combination with a permanent lower body having a front seat made integral therewith, having a transverse wall in the same plane as the back of said front seat the ends of which terminate in corner-posts, of an upper part consisting of a roof overhanging said front seat and having a transverse wall in substantially the same plane as the back of said front seat, the ends of which terminate in vertical corner-posts that rest upon the corner-posts of the transverse wall of the lower body and a seat integral with said upper part, and means for securing said posts together.

7. In a vehicle the combination with a permanent lower body having a front seat made integral therewith and having a portion extending to the rear of said seat the side walls of which have door-openings therein and to the rear of said door-openings have their upper edges inturned, of an upper body consisting of a roof overhanging said front seat, door-openings in its side walls in the rear of said front seat, doors hinged thereto closing both the door-openings therein and the door-openings in the lower body, and a seat connecting the lower edges of the side walls at the rear of the door-opening.

8. In a vehicle the combination with a permanent lower body having a front seat made integral therewith, having a transverse wall in the same plane as the back of said seat, the ends of which terminate in corner-posts, and having a portion extending to the rear of said front seat the side walls of which have door-openings, and to the rear of said door-openings have their upper edges inturned, of an upper body consisting of a roof overhanging said front seat, having a transverse wall in substantially the same plane as the back of said front seat, the ends of which terminate in vertical corner-posts that are removably secured to the corner-posts of the lower body, said upper body having door-openings in its side walls in the rear of said front seat of the doors hinged thereto closing both said door-openings therein and the door-openings in the lower body, and a seat connecting the lower edges of said side walls at the rear of the door-opening and resting and removably secured upon the inturned upper edges of the side walls of the rear portion of the lower body.

9. In a vehicle the combination with a permanent lower body comprising a dashboard, a front seat made integral therewith, and a portion extending to the rear of said seat, of an upper body removably secured thereto and consisting of a roof, a drop-frame secured to the forward end thereof, the lower edges of which are removably secured to said dashboard, a seat within said upper body, and a transverse wall depending from the roof the lower edges of which are removably secured to the transverse structure of the lower body in about the plane of the back of the front seat.

10. In a vehicle the combination with a permanent lower body comprising a dashboard, a front seat made integral therewith, a portion extending to the rear of said seat the side walls of which have door-openings therein, of an upper body consisting of a roof, a drop-frame depending from the front end thereof the lower portion of which is removably secured to the dashboard, a transverse wall depending from the roof in about the plane of the back of the front seat, the lower portion of which is removably secured to the structure of the lower body adjacent to said front seat, and comprising side walls having door-openings which together with the rear end wall rest upon and are removably secured to the upper edges of the side and end walls of the lower body, and doors hinged to the side walls of the upper body for closing both the door-openings therein and in said lower body.

In testimony whereof I hereunto set my hand and seal this 16th day of February, A. D. 1906.

WALTER N. BEECHER. [L. S.]

Witnesses:
ADA M. COX,
E. K. LUNDY.